United States Patent [19]

Manners

[11] 4,151,558
[45] Apr. 24, 1979

[54] POWER SUPPLY DISCHARGE CIRCUIT FOR TV RECEIVER

[75] Inventor: David E. Manners, Alexander, N.Y.

[73] Assignee: GTE Sylvania Incorporated, Stamford, Conn.

[21] Appl. No.: 866,292

[22] Filed: Jan. 3, 1978

[51] Int. Cl.² .................. H04N 3/18; H04N 5/44; H01J 29/70
[52] U.S. Cl. .................................. 358/190; 315/408
[58] Field of Search .................. 358/188, 190, 64; 315/408–410

[56] References Cited

U.S. PATENT DOCUMENTS 3,737,572  6/1973  Frizane et al. .................. 358/190

Primary Examiner—John C. Martin
Attorney, Agent, or Firm—Theodore D. Lindgren

[57] ABSTRACT

An improvement in a television receiver circuit for producing rapid discharge of the capacitors of the primary d.c. power supply upon turn-off of the receiver. The disclosed improvement eliminates the need for conventionally used bleeder resistors by the addition of a direct coupling means to existing horizontal sweep circuitry to derive a current which switches the horizontal driver transistor to continuous conduction upon turn-off of the receiver, thereby rapidly discharging the capacitors of the main power supply.

4 Claims, 1 Drawing Figure

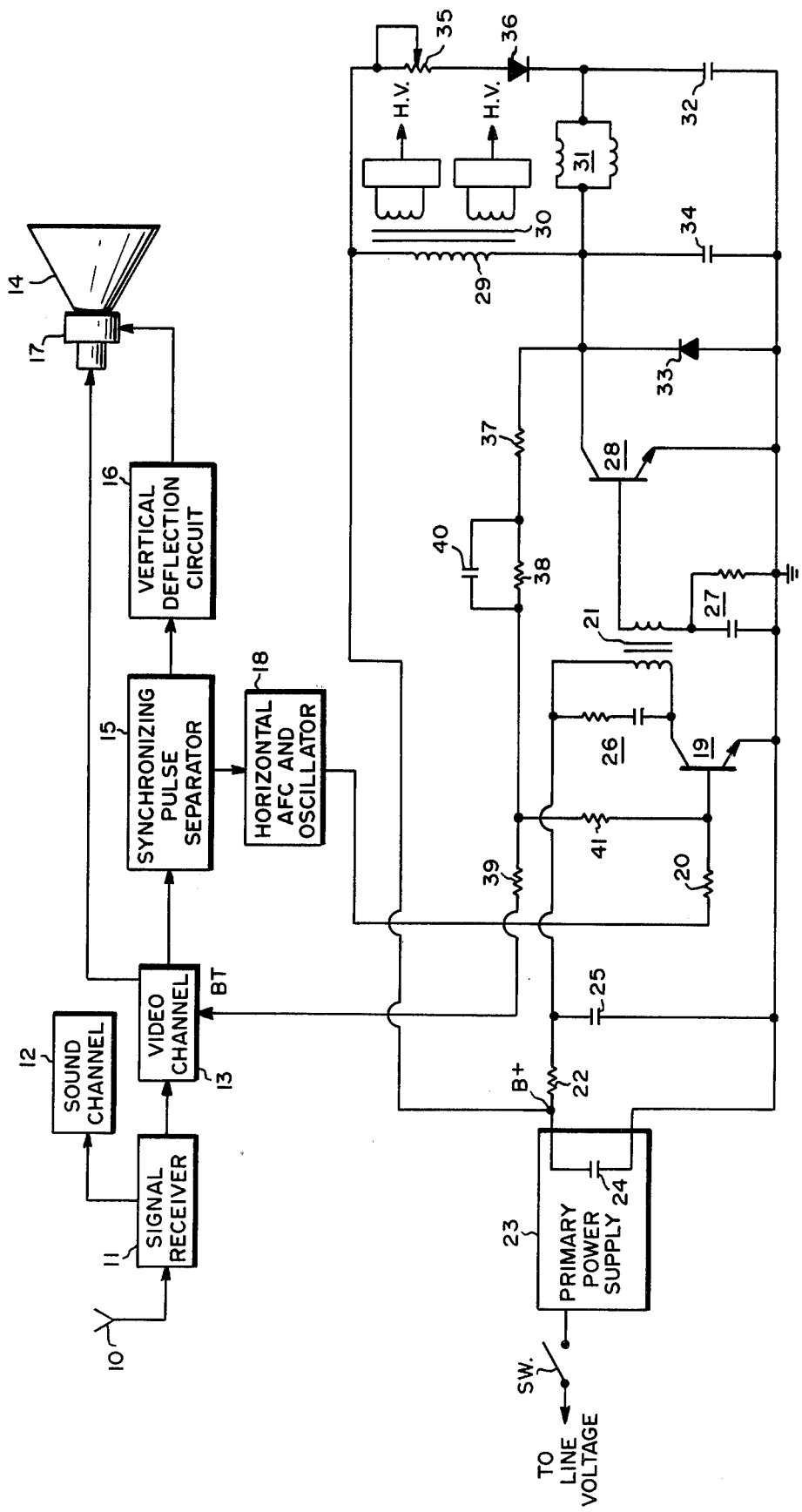

POWER SUPPLY DISCHARGE CIRCUIT FOR TV RECEIVER

FIELD OF THE INVENTION

This invention relates to television receiver circuits and particularly to power supply discharge circuitry pertaining thereto.

BACKGROUND OF THE INVENTION

Prior art television power supply circuits may be generally categorized into one group of circuits which utilizes bleeder resistors paralleling the power supply capacitor bank for discharge of same and into a second group which make no provision for discharge of said capacitor bank. Those power supply circuits which utilize a parallel-connected bleeder resistor require increased electrical power input because of the continual power losses in said resistor during receiver operation. Those power supply circuits having no parallel-connected bleeder resistor require that the capacitor bank discharge through the receiver circuitry connected to the power supply. However, the discharge time for the latter circuits has been found to be measured in minutes. Therefore, the increased set efficiency caused by elimination of parallel-connected bleeder resistors causes excessively long discharge times which create a hazard to servicemen and other persons who may come in contact with exposed circuit components.

SUMMARY OF THE INVENTION

The circuit of this invention overcomes the disadvantages of prior art circuits by providing a means for rapidly discharging the capacitor bank of a television receiver main power supply upon turn-off of the receiver while at the same time eliminating use of inefficient power supply bleeder resistors. The circuit in its preferred embodiment utilizes existing horizontal blanking pulse transmitting means normally connected between the collector of a horizontal output transistor and a video channel processing circuit. The embodiment requires direct coupling from a tapped point in the pulse transmitting means to the base of a horizontal driver transistor. The blanking pulses transmitted to the driver transistor do not affect operation of the receiver during use. However, at turn-off of the receiver the direct connection of the pulse transmitting means between the positively biased output transistor collector and the driver transistor base switches the driver transistor to a conducting state, thereby rapidly discharging the power supply capacitance bank.

BRIEF DESCRIPTION OF THE DRAWING

The sole FIGURE is a block and schematic diagram of a television receiver incorporating a preferred embodiment of the invention.

DETAILED DESCRIPTION OF THE PREFERRED EMBODIMENT

For a better understanding of the present invention, together with the advantages and capabilities thereof, reference is made to the following disclosure in conjunction with the accompanying drawing.

In the drawing, typical receiver components are shown in block diagram form. A signal receiving means illustrated as an antenna 10 is connected to an input of a signal receiver 11 for providing an RF signal modulated with a composite video signal. Signal receiver 11 includes the usual RF and IF circuitry for processing the received television signal and provides the audio portion thereof to a sound channel 12 and the video portion thereof to one input of a video channel 13. Video channel 13 includes the usual luminance circuitry, and in the case of a color television receiver, the usual chrominance circuitry. Video channel 13 provides one or more video signals to an image display device illustrated as a cathode ray tube (CRT) 14.

Blanking input terminal BT of video channel 13 receives blanking information from the horizontal deflection circuit. The information is used by video channel 13 to provide a signal which essentially cuts off the electron beam or beams of CRT 14 during retrace of the horizontal sweep.

At least the synchronizing pulse portion of the composite video signal in video channel 13 is coupled to a synchronizing pulse separator 15. Sync pulse separator 15 separates the vertical synchronizing pulses and couples them to a vertical deflection circuit 16. Vertical deflection circuit 16 provides suitable vertical deflection signals to a vertical deflection winding contained in a yoke 17 associated with CRT 14. Sync pulse separator 15 also couples horizontal synchronizing pulses to a horizontal deflection circuit which includes a horizontal AFC and oscillator 18 connected to the output of sync pulse separator 15.

The horizontal deflection circuit further includes a driver transistor 19. The output of oscillator 18 is connected by a resistor 20 to the base of transistor 19. The emitter of transistor 19 is connected to horizontal deflection circuit ground. The collector of transistor 19 is connected by a primary winding of driver transformer 21 in series with a resistor 22 to a B+ voltage source 24 includes an equivalent capacitor 24 connected between B+ terminal and ground. The junction of the primary winding of transformer 21 and resistor 22 is connected by a capacitor 25 to the circuit ground. Series RC circuit 26 is connected across the primary winding of transformer 21 for damping purposes. B+ voltage is typically developed by rectification of the AC line voltage and may be on the order approximately 140 volts with respect to ground. B+ voltage supply capacitance 24 is typically on the order of 1500 microfarads and is comprised of several parallel shunt capacitors, at least some of which are separated by series resistors or inductances. The relatively large capacitance 24 when charged to approximately 140 volts D.C. represents a hazard to those in near proximity to the chassis, such as service personnel, because the charged capacitance typically requires 45 seconds to decay to a level of 70 volts.

The horizontal deflection circuit also includes parallel RC circuit 27 connected between circuit ground and one end of a secondary winding of transformer 21. The other end of said secondary winding is connected to the base of horizontal output transistor 28. Transformer 21 therefore couples the collector of transistor 19 to the base of transistor 28. The emitter of transistor 28 is connected to circuit ground and the collector is connected via a primary winding 29 of flyback transformer 30 to source 23. The output of transformer 30 is used to furnish high voltage potential to CRT 14 as well as potentials different from, or isolated from source 23, to other receiver circuits.

Horizontal deflection winding 31 is illustrated as a pair of parallel connected windings and is typically included in yoke 17 associated with CRT 14 for deflecting the electron beam or beams therein in the horizontal directions. One end of winding 31 is connected to the collector of transistor 28 while the other end is connected by S-shaping capacitor 32 to circuit ground. A damper diode 33 and a retrace capacitor 34 are each connected between circuit ground and the collector of transistor 28. Source 23 is connected by a horizontal centering control 35 and diode 36 to the junction of winding 31 and capacitor 32 for biasing winding 31.

Those skilled in the art will realize that various components associated with transistor 19 and 28 are not illustrated in the drawing for reasons of clarity. For example, wave shaping and parasitic suppression circuitry is not included as well as the emitter-base connected resistors or capacitors associated with transistors 19 and 28.

In normal operation positive pulses from oscillator 18 are coupled to the base of transistor 19 which drives output transistor 28 via transformer 21. At the start of the trace interval diode 33 conducts current to winding 31 to provide the first half of the trace signal. Transistor 28 is turned on to provide the second half of the trace signal. At the end of the trace interval, transistor 28 is switched off to interrupt the current flow through winding 31. Winding 31 and capacitor 34 oscillate for one-half cycle to reverse current flow through winding 31 and at the same time provide a positive horizontal output or flyback pulse which is used for various purposes including energizing the windings of flyback transformer 30 and gating video channel 13 to blank the electron beam or beams of CRT 14 during retrace.

Horizontal retrace pulses from the collector of output transistor 28 are normally returned to video channel 13 through a blanking coupling means comprised of a chain of series resistances such as resistances 37, 38 and 39. Because the horizontal retrace pulse voltage has a maximum magnitude of approximately 1000 volts, it is common practice for each of resistances 37, 38 and 39 to be comprised of at least two inexpensive, low-voltage-rated resistors connected in series. The pulses, as previously explained, are used to blank the video signal during retrace of the horizontal sweep of the electron beam or beams of CRT 14. The returned pulses normally require a certain amount of shaping by a parallel, resistance-capacitance combination such as resistance 38 and capacitor 40. During operation of the receiver, the blanking pulses may be returned to the base of driver transistor 19 without adverse effect because during transmission of each pulse the base-emitter junction of transistor 19 has been previously forward biased by the signal from oscillator 18. The blanking pulses in the disclosed circuit are tapped off and returned to the base of driver transistor through connection of direct coupling means 41, shown as a resistance to the junction of resistances 38 and 39.

The effect of connecting the horizontal blanking pulses shaping means to the input of driver transistor 19 occurs only after removal of a.c. power from the set. At turn-off of switch SW the voltage of the collector of output transistor 28 is, except for a negligible drop through the primary 29 of transformer 30, equal to the B+ supply voltage across the large equivalent capacitance 24. Resistance 41 along with series resistors 37 and 38 allow transmission of sufficient current from the potential at the collector of transistor 28 to the base of transistor 19 to turn on said transistor 19. The charge on capacitance 24 is then discharged through resistor 22, the primary of transformer 21 and the collector-emitter path of transistor 19 to circuit ground. The time required for from 140 volts to 70 volts has been experimentally determined to be approximately 2 seconds compared to the 45 seconds discussed previously herein for the same circuit without the added resistor 41.

In one application of the disclosed circuit, the values of resistances 37, 38, 39 and 41 and of capacitor 40 constituting the horizontal blanking pulse shaping means are 44 kilohms, 33 kilohms, 22 kilohms, 33 kilohms and 33 picofarads, respectively. In the cited application the horizontal blanking pulses drove an integrated circuit which constitutes a major part of video channel circuit 13.

The improvement to the television receiver circuit described above could also be accomplished by removing the connection of coupling means or resistances 41 at the junction of resistances 38 and 39, and with appropriate change in values of said resistances, connecting said removed terminal of means 41 to the collector of output transistor 28. The embodiment of the drawing is, however, preferred for use in the present component market because the embodiment may be realized with the addition to the receiver circuit of, in most cases, only one inexpensive low-voltage-rated resistor. Because of the relatively large magnitude of the peak voltage of the horizontal output pulses, the suggested connection of means 41 between the collector of transistor 28 and the base of transistor 19 would require either the use of a presently expensive high-voltage rated resistor or a series chain of perhaps six inexpensive low-voltage-rated resistors.

While there has been shown and described what is at present considered the preferred embodiment of the invention, it will be obvious to those skilled in the art that various changes and modifications may be made therein without departing from the invention as defined by the appended claims.

I claim:

1. An improvement in a television receiver circuit having a primary power supply with at least one shunt capacitor, having a video channel circuit with a blanking input terminal, having an image display device with horizontal deflection winding and having a horizontal deflection circuit connected to said winding, said deflection circuit comprised in part of a driver transistor with grounded emitter, of an output transistor with grounded emitter and of a driver transformer coupling the collector of said driver transistor to the base of said output transistor, said collector of said output transistor directly coupled by blanking coupling means to said blanking input terminal of said video channel circuit, said power supply directly coupled to the collector of said output transistor by the primary of a flyback transformer and directly coupled to the collector of said driver transistor by a voltage dropping resistor and by the primary of said driver transformer, wherein the improvement comprises direct coupling means between a tap-off of said blanking coupling means and the base of said driver transistor for causing discharge of said shunt capacitor upon turn-off of said receiver.

2. The improvement of claim 1 in which said direct coupling means is comprised of a resistance.

3. An improvement in a television receiver circuit having a primary power supply with at least one shunt capacitor, having an image display device with horizontal deflection winding and having a horizontal deflection circuit connected to said winding, said deflection circuit comprised in part of a driver transistor with grounded emitter, of an output transistor with grounded emitter, of a driver transformer coupling the collector of said driver transistor to the base of said output transistor, said power supply directly coupled to the collector of said output transistor by the primary of a flyback transformer and directly coupled to the collector of said driver transistor by a voltage dropping resistor and by the primary of said driver transformer, wherein the improvement comprises direct coupling means between said collector of said output transistor and the base of said driver transistor for causing discharge of said shunt capacitor upon turn-off of said receiver.

4. The improvement of claim 1 wherein said direct coupling means is a resistance.

* * * * *